March 15, 1955 O. H. SCHMALE ET AL 2,704,190
STORAGE REELS FOR FLEXIBLE SPRINKLERS
Filed Jan. 18, 1954

INVENTORS
OTTO H. SCHMALE
ARTHUR C. BULL
BY
ATTORNEY

United States Patent Office 2,704,190
Patented Mar. 15, 1955

2,704,190
STORAGE REELS FOR FLEXIBLE SPRINKLERS
Otto H. Schmale and Arthur C. Bull, Grand Island, Nebr.; said Bull assignor to said Schmale
Application January 18, 1954, Serial No. 404,755
4 Claims. (Cl. 242—86)

A type of flexible lawn sprinkling devices are at present very popular. These devices consist of an elongated, flexible plastic tube having a hose coupling at one extremity and provided with very fine perforations for slowly exuding the water for lawn soaking purposes. These devices are often formed from a plurality of tubes arranged side by side to form a relatively wide, flat cross-section so that they are difficult to coil for storage purposes.

This invention relates to a reel structure for coiling flexible sprinklers of the above type and has for its principal object the provision of a lightweight, economical, highly efficient reel structure upon which elongated flexible sprinklers may be quickly and easily reeled and stored when not in use.

Another object of the invention is to so construct the device that it can be readily carried in the hand and to provide a reel which will be self-supporting upon any supporting surface.

A further object is to provide a reel which will resiliently resist unreeling so that the sprinkler will be retained securely in place until desired for use.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
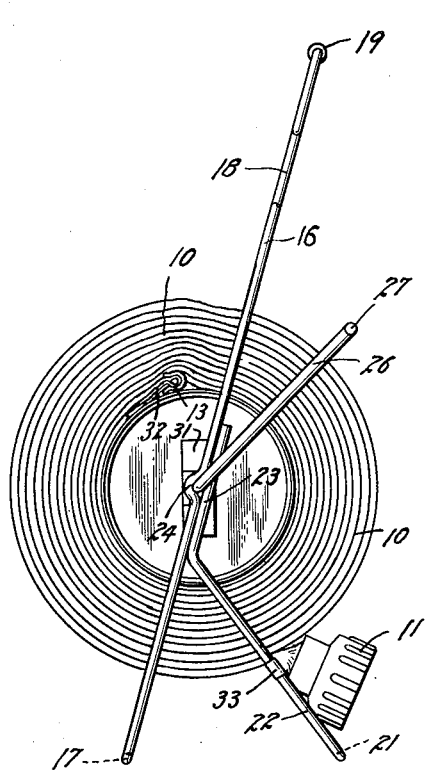
Fig. 1 is a side view of the improved sprinkler reel, illustrating a conventional flexible lawn sprinkler reeled thereon.
Figure 2:
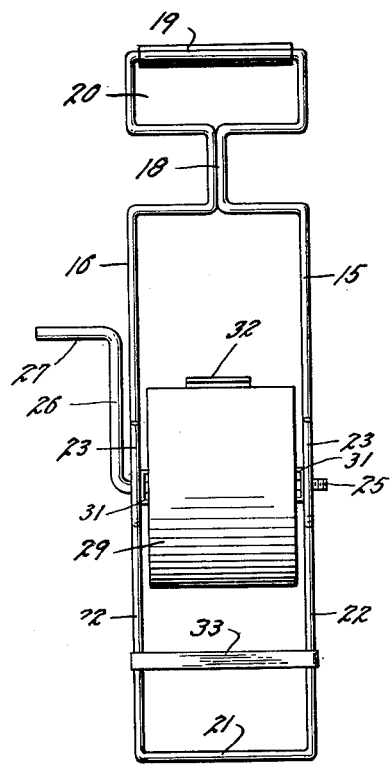
Fig. 2 is a front view of the improved reel, with the sprinkler removed.
Figure 3:
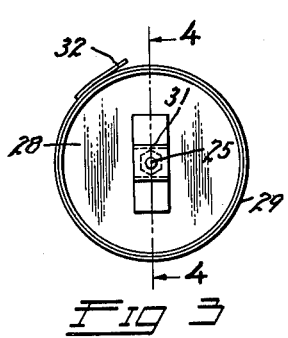
Fig. 3 is a detail view, illustrating the end of a spool structure employed in the improved reel.
Figure 4:
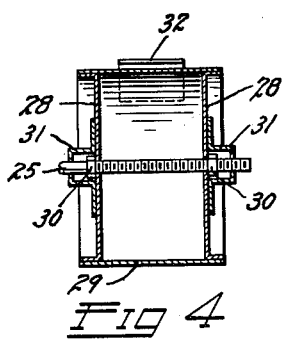
Fig. 4 is a longitudinal section through the reel structure, taken on the line 4—4, Fig. 3.
Figure 5:
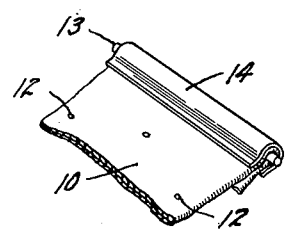
Fig. 5 is a detail, fragmentary view, illustrating the terminal extremity of a conventional flexible, perforated lawn sprinkler.

In the drawing, a conventional flexible lawn sprinkler tube is indicated at 10, terminating at one extremity in a hose coupling 11. Such sprinkling devices are provided with water jet perforations, such as indicated at 12. The extremity of the sprinkler tube 10 is wrapped about a terminal rod 13 and clamped closed by means of an elongated, U-shaped clamping clip 14.

The improved reel comprises a vertically elongated rectangular reel frame consisting of two straight side bars 15 and 16 joined at their bottoms by means of a horizontal cross bar 17. The upper extremities of the side bars 15 and 16 are bent inwardly and upwardly in contact with each other to form a handle portion 18. The bars at the upper extremity of the handle portion 18 are bent outwardly, upwardly, and inwardly into the extremities of a hand grip sleeve 19 to form an open finger receiving loop 20.

The various bars could be single elements secured together in any desired manner. It is preferred, however, to form the entire frame from a single heavy wire or rod, with its two extremities extending into and being concealed by the hand grip sleeve 19.

An inclined, U-shaped brace frame is secured to and supports the reel frame. The brace frame comprises a heavy wire or rod bent to form a horizontal bottom portion 21 and two inclined, parallel side portions 22. The side portions are bent at an obtuse angle at their upper extremities to form straight terminal portions 23 which are welded to the side bars 15 and 16.

At the portion where the straight portions 23 overlie the side bars 15 and 16, the latter members are deformed forwardly to form two indented aligned bearing portions 24. A spool shaft 25 extends through the bearing portions 24 and projects oppositely outward from the two side bars 15 and 16. One extremity of the spool shaft 25 is bent at right angles to the remainder to form a crank portion 26 which terminates in a hand crank 27.

The spool shaft 25 extends concentrically through two spaced-apart spool discs 28 which are provided with peripheral flanges which are secured within the opposite faces of a cylindrical spool drum 29 in any desired manner, such as by soldering, spot welding or the like. The portion of the shaft 25 which extends through the spool is threaded and provided with two spool-clamping nuts 30 which are tightly screwed against the outer faces of the discs 28.

An offset spacing strip 31 is secured to the outer face of each disc 28. The shaft 25 passes through each of the strips 31 and the latter act to space the spool medially between the two side bars 15 and 16. The surface of the spool drum 29 is provided with a projecting attachment clip 32 and a relatively wide, stretched, flexible rubber band 33 extends between the inclined side portions 22 of the inclined brace frame below the spool.

Let us assume it is desired to reel the flexible sprinkler 10 upon the spool drum 29. The clip 14 on the extremity of the sprinkler is engaged beneath the projecting edge of the attachment clip 32 and the hand crank 27 is rotated in a clockwise direction (in Fig. 1) so as to draw the sprinkler inwardly over the rubber band 33 and about the spool drum until the entire length of the sprinkler has been reeled onto the drum.

As the coil of sprinkler increases in diameter, it will gradually force the rubber band 33 downwardly on the inclined side portions 22 to maintain a constant friction on the sprinkler to insure a tight coil. The final or coupling end of the sprinkler is held tightly in place by the resilient rubber band 33.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A reel for flexible lawn sprinkling devices comprising: a rod bent to form a relatively short, horizontal bottom portion; two vertically extending, relatively long, parallel side portions and a hand-receiving loop formed at the upper extremities of said side portions, said side portions being indented to form two aligned bearing loops; a horizontal crank shaft rotatably mounted in said bearing loops; a crank on one extremity of said crank shaft; a cylindrical spool fixedly mounted on said crank shaft between said side portions; and a sprinkler-engaging device secured on the external cylindrical surface of said spool and extending away therefrom to form a hook for receiving a sprinkler to be wound upon said spool.

2. A reel for flexible lawn sprinkling devices as described in claim 1 and having a U-shaped brace frame consisting of a horizontal bottom portion; two inclined, parallel side portions; and straight terminal portions, said straight terminal portions being secured to the side members of the reel frame over the indented bearing loops therein to retain said crank shaft in place in said bearing loops.

3. A reel for flexible lawn sprinkling devices as described in claim 2 having a spacing member secured to each side of said spool adjacent said shaft and acting to retain said spool medially of said reel frame.

4. A reel for flexible lawn sprinkling devices as described in claim 3 having a flexible resilient retaining member extending between the legs of said brace frame and positioned to contact a flexible sprinkler wound about said spool.

References Cited in the file of this patent
UNITED STATES PATENTS

| | | |
|---|---|---|
| 766,736 | Scott | Aug. 2, 1904 |
| 1,915,632 | Marks | June 27, 1933 |
| 2,124,063 | Harris, Jr. | July 19, 1938 |
| 2,401,286 | Wright | May 28, 1946 |
| 2,610,003 | Bond et al. | Sept. 9, 1952 |